Nov. 2, 1937.    C. M. HANNAFORD    2,098,185
PIN OR BOLT LOCK
Filed July 21, 1936
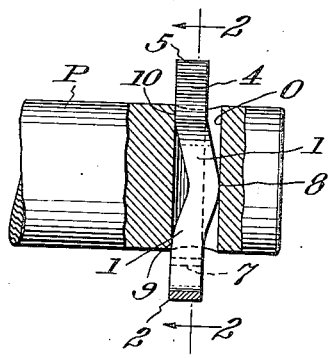
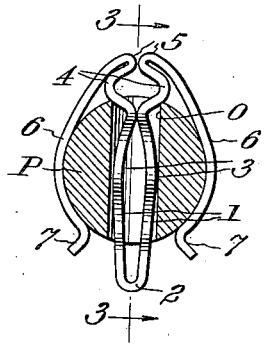
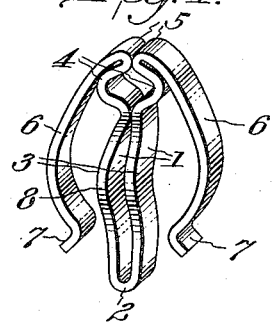
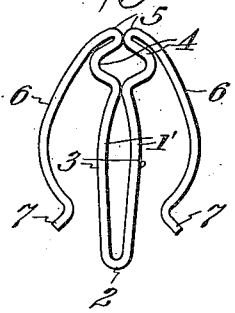
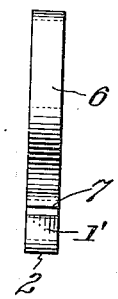
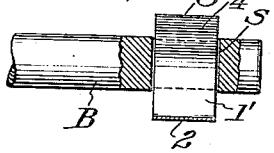
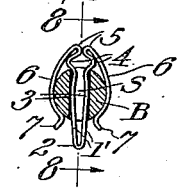
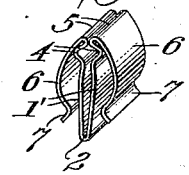
Inventor
Cleon M. Hannaford
By W. T. Kinsell Jr.
Attorney Patented Nov. 2, 1937

2,098,185

UNITED STATES PATENT OFFICE 2,098,185

PIN OR BOLT LOCK

Cleon M. Hannaford, Petersburg, Va., assignor to Car Devices Company, Incorporated, Richmond, Va., a corporation of Virginia Application July 21, 1936, Serial No. 91,766

8 Claims. (Cl. 85—8.5)

This invention relates to pin or bolt locks, and has special reference to devices of this character which may be substituted for cotters of conventional type.

The pin or bolt lock of the invention includes a stem for insertion in an opening in a pin or bolt, and offstanding, preferably resilient, means connected with the stem and adapted to embrace and engage the exterior surface of the pin or bolt when the device is inserted.

This type of pin or bolt lock is not, when broadly considered, novel, but the device of the present invention embodies refinements of detail whereby it is made of a more practical nature, greater efficiency when in use, and capable of longer service and greater ease of application and removal than any devices of a similar nature now known.

In pin or bolt locks of the type referred to, and of known construction, the shape and cooperative characteristics of the parts, particularly of the stem and resilient embracing means, is such that it is possible, in application of the locking device to a pin or bolt, particularly in cases where the device is hammered into place, to so distort the parts that their capability for effective functioning is destroyed. This is especially true with regard to the resilient embracing means, it being apparent that if the device is hammered or otherwise forced into place in the opening in the pin or bolt, too great insertion thereof may result in distortion or even breakage of these means so that they will not appropriately embrace the exterior surface of the pin or bolt. Inasmuch as it is mainly upon such embracing engagement of these means that accidental displacement or removal of the device from the pin or bolt depends, it will be apparent that distortion or breakage thereof may, and probably will, result in failure of the device as a practical locking means.

Moreover, for a locking device of the character in question to function properly, there must be sufficient extension of its parts at both ends of the opening through the pin or bolt to provide adequate bearing surfaces against which members mounted upon or connected by the pin or bolt may bear or abut, and if the device is improperly applied, such as by over-insertion, as just explained, such adequate bearing surfaces will not be provided.

The need for assurance of proper application of such locking devices to pins or bolts, and for adequate means to guard against their accidental removal or loss therefrom, will be appreciated when it is considered that they are used largely, although not exclusively, in connection with railway equipment where the safety factor must be maintained exceptionally high. Hence, the hereinafter referred to refinements of detail of the locking device of the present invention are particularly important.

One of the objects of the present invention is to provide a locking device having, generally, the characteristics hereinabove referred to, wherein means are provided for so limiting insertion of the stem of the device in an opening in a pin or bolt that undue distortion or breakage of the parts of the device, particularly of its resilient embracing means, is prevented.

Another object of the invention is to provide for so limiting insertion of the device in an opening in a pin or bolt that portions of it will project at opposite sides of the pin or bolt to an extent adequate to furnish the desired bearing surfaces referred to.

A further object of the invention is to provide for so limiting insertion of the device in a pin or bolt that the resilient embracing means will be properly positioned to effectively engage the pin or bolt and thereby prevent accidental withdrawal or loss of the device.

A still further object of the invention is to provide means whereby the stem of the device is enabled to intimately and frictionally engage the wall of the opening in the pin or bolt, thus guarding against lateral movement thereof in such opening and wear and rattling incident thereto.

The invention contemplates a pin or bolt lock formed, preferably, of a length of flat metallic stock capable of receiving and maintaining a desired spring temper, and including a stem for insertion in an opening in a pin or bolt, and means offstanding from said stem and adapted for resilient embracing engagement with the exterior surface of the pin or bolt, the stem being provided with means for limiting its insertion in the opening in the pin or bolt, and means for properly locating it therein, all as will be explained hereinafter more fully and finally claimed.

In the accompanying drawing illustrating the invention, in the several figures of which like parts are similarly designated, Figure 1 is a perspective view illustrating a preferred embodiment of the invention.

Fig. 2 illustrates the device of the invention in the form illustrated in Fig. 1 applied to a pin, this view being, in part, in section substantially on the line 2—2 of Fig. 3.

Fig. 3 is a section taken on the line 3—3 of Fig. 2.

Figs. 4 and 5 illustrate, in front and side elevation, respectively, a modified form of the device.

Fig. 6 illustrates, in perspective, a still further modification of another preferred embodiment of the invention, particularly adapted for use with a bolt having an elongated slot for the reception of a locking device.

Fig. 7 is a view similar to Fig. 2, but illustrating the modification of Fig. 6 in its application to a bolt of the type referred to, and Fig. 8 is a section taken substantially on the line 8—8 of Fig. 7.

In the embodiment of the invention as in Figs. 1, 2 and 3, in which is shown a locking device particularly adapted for insertion in a cylindrical opening in a pin or bolt, it will be noted that, as hereinbefore indicated, the device comprises a piece of flat metallic stock of a width appropriate to adapt the device for use in an opening of predetermined diameter, and having a thickness and inherent metallic characteristics to make it capable of receiving and maintaining a desired spring temper. This piece of stock is bent substantially midway of its length to provide two similar elements 1 forming the stem of the locking device and joined at 2 at the location of the bend to furnish a leading end for the stem whereby it may readily be inserted in the opening O of the pin or bolt P. The elements 1 of the stem are bowed substantially midway of their length, as indicated at 3 to provide for engagement of the stem with the wall of the opening O, and they are provided, also, with similar laterally offset portions 4 which increase the lateral dimension of the stem beyond the similar dimension of the opening O to limit insertion of the stem in the opening. The stem-forming elements 1 merge at 5 into offstanding, preferably resilient, arcuate arms 6 which provide means for embracing engagement with the exterior surface of the pin or bolt P, and these embracing means or arms have their terminals 7 turned outwardly to facilitate spreading of them over the periphery of the pin or bolt when the locking device is applied thereto.

The shoulders or re-entrant bends formed where the elements 1 merge into the arms 6, as indicated at 5, are preferably in substantially abutting relation to thereby prevent reduction of the enlargement of the stem provided by the offset portions 4 thereof, thus guarding against the possibility of jamming the offset portions into the opening O should undue pressure be applied, and assuring proper positioning of the device upon the pin or bolt.

As will be apparent from an inspection of Fig. 2, the stem, including the offset portions thereof, is of such length that when the device is properly applied it will extend outwardly at opposite sides of the pin or bolt, thus providing adequate bearing surfaces for engagement with members carried or connected by the pin or bolt. Moreover, the arrangement and curvature of the resilient embracing means or arms 6 and the offset portions 4 is such that when the device is properly positioned, as shown, the arms will substantially conform to the curvature of the pin or bolt and effectively embrace it to prevent accidental withdrawal or loss of the locking device.

As shown, particularly in Figs. 1 and 3, the stem is provided with a projection or bend 8 in each of its elements 1 whereby frictional or wedging engagement of the stem with the wall of the opening O is afforded. This frictional or wedging engagement tends to furnish a tight fit and prevent any lateral movement of the stem in the opening and the wear and rattling which might occur incident to such movement. Furthermore, as a feature of cooperation between the offset portions 4 and the projection or bend 8, it is to be noted that the offset portions so position the projection 8 in the opening O that its zones of junction 9 and 10 with the stem are given their most effective bearing positions against the wall of the opening.

The form of the invention illustrated in Figs. 4 and 5 is similar to that just described, but the projection or bend 8 in the stem is omitted, the elements 1' of the stem being straight when viewed from the side, as indicated in Fig. 5. Aside from this omission this modified form of the device is, in construction and functional characteristics, the equivalent of the form of Figs. 1, 2 and 3.

The form of the invention illustrated in Figs. 6, 7 and 8 closely resembles that illustrated in Figs. 4 and 5, so far as refinements of its details of construction are concerned. However, it is shown as made, preferably, of lighter gage metallic stock, and of smaller size than the forms of the device hereinbefore described, and the stock is of greater width, whereby the device is adapted for association with a pin or bolt B, ordinarily of small diameter, and having its opening in the form of an elongated slot S.

Obviously, undue pressure, particularly violent hammering, upon a locking device constructed even as contemplated by this invention may result in distortion or breakage of the parts of the device, and undue insertion of its stem in the opening in the pin or bolt. However, the device of the invention is so designed and so functions that under ordinary conditions of application and use, even when hammered into place, it will properly position itself, and effectively lock in proper position.

Various changes and modifications are contemplated as within the spirit of the invention and the scope of the following claims.

What I claim is:—

1. A pin or bolt lock, including a stem for insertion in an opening in the pin or bolt and having a leading end, means offstanding from said stem remote from said leading end and arranged to embrace the exterior surface of the pin or bolt, said stem being of a length sufficient to adequately engage the walls of said opening and provided adjacent to said offstanding means with stop means to limit its insertion in said opening, whereby projection of the stem from said opening and proper engagement of said embracing means may be assured.

2. A pin or bolt lock, including a stem for insertion in an opening in the pin or bolt and having a leading end, means offstanding from said stem remote from said leading end and arranged to embrace the exterior surface of the pin or bolt, said stem being of a length sufficient to adequately engage the walls of said opening and provided adjacent to said offstanding means with laterally offset stop means to limit its insertion in said opening, whereby projection of the stem from said opening and proper engagement of said embracing means may be assured.

3. A pin or bolt lock, including a stem comprising a pair of similar elements joined to furnish a leading end and adapted for insertion in an opening in the pin or bolt, each of said elements merging remote from said leading end into an offstanding substantially arcuate resilient arm for yielding embracing engagement with the exterior surface of the pin or bolt, said stem being provided adjacent to said offstanding means with stop means to limit its insertion in said opening, whereby projection of the stem from the surface of the bolt and appropriate engagement of said arms with such surface may be assured.

4. A pin or bolt lock, including a stem comprising a pair of similar elements joined to furnish a leading end and adapted for insertion in an opening in the pin or bolt, each of said elements merging remote from said leading end into an offstanding substantially arcuate resilient arm for yielding embracing engagement with the exterior surface of the pin or bolt, each of the elements of said stem being provided adjacent to its junction with its respective arm with a laterally offset stop portion to limit insertion of the stem in said opening, whereby projection of the stem from the surface of the bolt and appropriate engagement of said arms with such surface may be assured.

5. A pin or bolt lock, including a stem comprising a pair of similar elements joined to furnish a leading end and adapted for insertion in an opening in the pin or bolt, each of said elements merging remote from said leading end into an offstanding arm for embracing the exterior surface of the pin or bolt and each of the elements of said stem being provided adjacent to its junction with its respective arm with a laterally offset stop portion, said laterally offset stop portions serving to increase the lateral dimension of the stem in excess of the similar dimension of the opening in the pin or bolts to thus limit insertion of the stem in said opening, and the pair of elements having portions substantially in abutting relation adjacent to said offset stop portions to thus prevent reduction of the lateral dimension of the stem at said offset stop portions upon insertion of the stem in said opening, whereby adequate projection of the stem from said opening and proper engagement of said embracing arms may be assured.

6. A pin or bolt lock, including a stem for insertion in an opening in the pin or bolt and provided with a leading end, means offstanding from said stem remote from said leading end and arranged to embrace the exterior surface of the pin or bolt, said stem being of a length sufficient to adequately engage the walls of said opening and provided adjacent to said offstanding means with stop means to limit its insertion in said opening, whereby projection of the stem from said opening and proper engagement of said embracing means may be assured, said stem being provided also with a lateral projection for frictional engagement with the wall of said opening.

7. A pin or bolt lock, including a stem comprising a pair of similar elements joined to furnish a leading end and adapted for insertion in an opening in the pin or bolt, each of said elements being bowed to provide for engagement of the stem with the wall of said opening and merging remote from said leading end into an offstanding substantially arcuate resilient arm for yielding embracing engagement with the exterior surface of the pin or bolt, said stem being provided adjacent to the junction therewith of said arms with stop means to limit its insertion in said opening, whereby projection of the stem from the surface of the bolt and appropriate engagement of said arms with such surface may be assured.

8. A pin or bolt lock, including a stem comprising a pair of similar elements joined to furnish a leading end and adapted for insertion in an opening in the pin or bolt, each of said elements being bowed outwardly from the other and provided with a bend substantially normal to its bow to insure frictional engagement of the stem with the wall of said opening, and each element merging remote from said leading end into an offstanding substantially arcuate resilient arm for yielding embracing engagement with the exterior surface of the pin or bolt, said stem being provided adjacent to the junction therewith of said arms with stop means to limit its insertion in said opening, whereby projection of the stem from the surface of the bolt and appropriate engagement of said arms with such surface may be assured.

CLEON M. HANNAFORD.